United States Patent
Medina et al.

(10) Patent No.: US 8,923,135 B2
(45) Date of Patent: Dec. 30, 2014

(54) SYSTEM AND METHOD TO DETECT A FAULT IN TRANSMISSION OF A STREAM OF MEDIA DATA CORRESPONDING TO A MEDIA CHANNEL

(75) Inventors: Douglas Medina, Grain Valley, MO (US); Frank Coppa, Kansas City, MO (US); Christopher Heck, Lees Summit, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 720 days.

(21) Appl. No.: 12/822,756

(22) Filed: Jun. 24, 2010

(65) Prior Publication Data

US 2011/0317020 A1    Dec. 29, 2011

(51) Int. Cl.
*H04N 17/04* (2006.01)
*H04N 17/00* (2006.01)

(52) U.S. Cl.
CPC .................................. *H04N 17/004* (2013.01)
USPC ............................................ 370/242; 714/45

(58) Field of Classification Search
None
See application file for complete search history.

(56) References Cited

U.S. PATENT DOCUMENTS

| | | | |
|---|---|---|---|
| 4,404,514 A | 9/1983 | Reichert, Jr. | |
| 5,221,967 A | 6/1993 | Ward et al. | |
| 5,283,639 A | 2/1994 | Esch et al. | |
| 6,160,991 A | 12/2000 | Chappell et al. | |
| 6,535,480 B1 | 3/2003 | Bhagavath et al. | |
| 6,986,158 B1 * | 1/2006 | Terui et al. | 725/116 |
| 2004/0093370 A1 | 5/2004 | Blair et al. | |
| 2005/0278760 A1 | 12/2005 | Dewar et al. | |
| 2006/0023067 A1 | 2/2006 | Yang | |
| 2006/0218612 A1 | 9/2006 | Johnson et al. | |
| 2006/0253874 A1 | 11/2006 | Stark et al. | |
| 2008/0040769 A1 | 2/2008 | Cha et al. | |
| 2008/0066113 A1 | 3/2008 | Skelly | |
| 2008/0104454 A1 * | 5/2008 | White | 714/48 |
| 2008/0192119 A1 | 8/2008 | Li et al. | |
| 2009/0285106 A1 * | 11/2009 | Bernard et al. | 370/242 |
| 2010/0154011 A1 * | 6/2010 | Soo et al. | 725/101 |

* cited by examiner

*Primary Examiner* — Jianye Wu
(74) *Attorney, Agent, or Firm* — Toler Law Group, PC (57) ABSTRACT

A particular method may include detecting at a first network device of a video distribution network a fault in transmission of a stream of media data with a media channel. The method also includes, in response to detecting the fault, transmitting a notification that includes fault information corresponding to the detected fault and the stream of media data corresponding to the media channel from the first network device to a second network device of the video distribution network.

20 Claims, 6 Drawing Sheets

SYSTEM AND METHOD TO DETECT A FAULT IN TRANSMISSION OF A STREAM OF MEDIA DATA CORRESPONDING TO A MEDIA CHANNEL

FIELD OF THE DISCLOSURE

The present disclosure relates generally to detecting a fault in transmission of a stream of media data corresponding to a media channel.

BACKGROUND

A media channel that is broadcast from a service provider to a subscriber may encounter a fault in transmission (e.g., damaged or missing audio and/or video). A service provider may attempt to detect and remedy the fault instead of waiting for the subscriber to report the fault. For example, a network device of a service provider network may scan through channels looking for faults in media channels provided to the subscriber. In this case, after a fault is identified, the network device may store information related to the identified fault. In response to receiving from the service provider a request for the recorded information, the network device may transmit the stored information to the service provider.

DETAILED DESCRIPTION

An internet protocol television quality monitor (IQM) unit at a first office (e.g., a local video head end office (VHO) or a super head end office (SHO)) scans media channels that are output from a set top box (STB) to detect faults or error conditions in transmission of the media channels. In response to detecting a fault, the IQM unit may transmit an alarm to a second office (e.g., a video operations center (VOC) or a national network operations center (NNOC)). The alarm may indicate a channel identifier and an office identifier (e.g., which VHO is broadcasting the channel experiencing the fault) and the type of the fault (e.g., blank video, frozen video, macro-blocked video, silent audio, audio noise, incorrect audio levels).

In addition to transmitting the alarm, the IQM unit may also transmit to the second office a stream of media data (e.g., video and audio) corresponding to the media channel with the fault. For example, the IQM unit may stream the media data to the second office without storing the media data locally at the first office. In this case, the original format of the media data (as received from the STB) may be preserved without conversion, thereby maintaining the media data in its original format for troubleshooting. As such, the second office receives the same stream of media data that is output by the set top box.

In response to receiving the alarm, the second office may record the stream of media data corresponding to the media channel on a digital video recorder (DVR) at the second office. The recording of the stream of media data stored at the second office may be used by staff at the second office to troubleshoot and remedy the fault in transmission of the media channel. By providing access to the media stream associated with a fault to the staff responsible for clearing the alarms at the second office without the staff having to request the fault content, the capabilities of the IQM process may improve network reliability, increase video quality, and boost productivity of the troubleshooting staff. In addition, because the stream of media data is not stored locally at the first office but is streamed without conversion to the second office, the stream of media data received by the second office includes all of the information output by the monitored set top box. By having all of the information that is output from the set top box, the troubleshooting staff may have a greater likelihood of remedying the fault than if the stream of media data was previously converted.

In a particular embodiment, a method includes detecting at a first network device of a video distribution network a fault in transmission of a stream of media data corresponding to a media channel. The method also includes in response to detecting the fault, transmitting a notification that includes fault information corresponding to the detected fault and the stream of media data corresponding to the media channel from the first network device to a second network device of the video distribution network.

In a particular embodiment, a method includes receiving at a second network device of a video distribution network from a first network device of the video distribution network a notification that includes fault information indicating a fault with transmission of a stream of media data corresponding to a media channel monitored at the first network device and the stream of media data corresponding to the media channel. The method also includes in response to receiving the notification, recording the stream of media data at the second network device.

In a particular embodiment, a system includes a management unit of a video distribution network. The management unit is configured to receive a notification from a monitoring unit of the video distribution network. The notification includes fault information indicating a fault with transmission of a stream of media data corresponding to a media channel monitored at the monitoring unit and the stream of media data corresponding to the media channel. The system also includes a digital video recorder (DVR) coupled to the management unit. The DVR is configured to record the stream of media data in response to the management unit receiving the notification.

Figure 1:
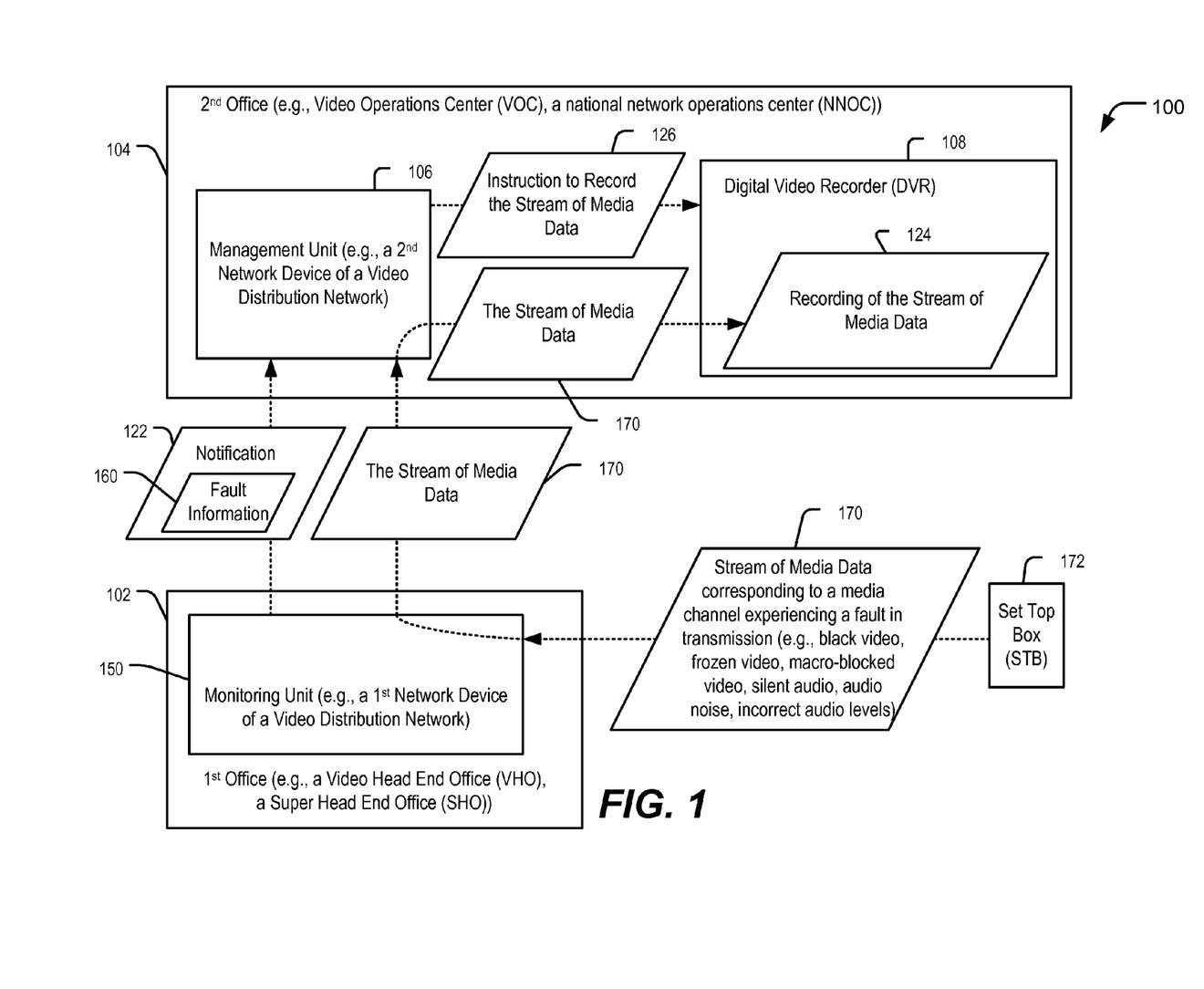
FIG. 1 is a diagram of a first embodiment of a system to detect a fault in transmission of a stream of media data corresponding to a media channel.

Referring to FIG. 1, a particular embodiment of a system 100 to monitor and detect a fault in transmission of a media stream corresponding to a media channel is disclosed. The system 100 may include a video distribution network that includes a first office 102 and a second office 104. The first office 102 may be a video head end office (VHO) or a super head end office (SHO) that transmits media channels to set top boxes of subscribers. For example, the first office 102 may receive the media channel from a content source via a multicast group. To detect faults that the subscribers may be experiencing with the transmission of the media channels, the first office 102 may include a monitoring unit 150 (e.g., a first network device) that monitors the output of a set top box 172. For example, the monitoring unit 150 may detect a fault in transmission of a stream of media data 170 (e.g., video and audio) corresponding to a media channel (e.g., a television channel) that is provided to a subscriber that receives the media channel from the first office 102. The second office 104 may be a video operations center (VOC) or a national network operations center (NNOC) that includes troubleshooting staff trained to remedy detected faults.

The first office 102 may include an internet protocol television (IPTV) quality monitor (IQM) tool. The set top box 172 monitored by the monitoring unit 150 may be a test set top box or a set top box of a subscriber of content provided by the first office 102. In a particular embodiment, the first office 102 monitors the outputs of a plurality of set top boxes (not shown). The monitoring unit 150 may monitor the set top box 172 by scanning media channels that are output by the set top box 172 to check for faults. For example, the monitoring unit 150 may be an IQM robot (i.e., an automated system that scans for certain defects in transmission of media channels).

In response to detecting a fault in transmission of one of the monitored media channels, the monitoring unit 150 may be configured to determine a type of the detected fault. For example, the monitoring unit 150 may determine that the detected fault associated with the transmission of the stream of media data 170 is a blank video, a frozen video, silent audio, audio noise, incorrect audio levels, or a combination thereof.

In response to detecting the fault, the monitoring unit 150 may generate a notification 122. The monitoring unit 150 may be configured to indicate the type of the fault in fault information 160 that is included in the notification 122. The notification 122 may be a simple network management protocol (SNMP) message (e.g., a trap protocol data unit (PDU)). In a particular embodiment, the notification 122 is user configurable, such that a user of the monitoring unit 150 may select which network parameters to include in the notification for which particular faults or error conditions associated with transmission of the stream of media data 170. For example, before the monitoring unit 150 begins monitoring the set top box 172, the user (e.g., a member of the troubleshooting staff of the second office 104) may program the monitoring unit 150 to configure the notification 122 to include specific codes that may be useful to the user for remedying the fault. The monitoring unit 150 may transmit the notification 122 to a second network device 106 (e.g., a management unit) of the second office 104.

The monitoring unit 150 may also be configured to transmit to the management unit 106 of the second office 104 the stream of media data 170 corresponding to the media channel. The stream of media data 170 may be used at the second office 104 to troubleshoot the detected fault. For example, a member of the troubleshooting staff at the second office 104 may make a decision regarding how to troubleshoot the fault based on information within the stream of media data 170. To illustrate, the information may indicate that the stream of media data 170 includes a blank video, a frozen video, silent audio, audio noise, incorrect audio levels, or a combination thereof.

To preserve the quality of the stream of media data 170 for troubleshooting, the first office 102 may transmit the stream of media data 170 without storing the stream of media data 170. For example, the first office 102 may immediately transmit the stream of media data 170 received from the set top box 172 to the management unit 106 of the second office 104 in response to detecting a fault. To illustrate, the stream of media data 170 may be received from the set top box 172 in a digital format and may be transmitted to the management unit 106 of the second office 104 in the same digital format without being converted to an analog format for storage at the first office 102. Thus, the second office 104 receives the same stream of media data 170 that is output by the set top box 172.

The second office 104 may record the stream of media data 170 corresponding to the media channel. For example, in response to receiving the stream of media data 170, the management unit 106 may provide an instruction 126 to a digital video recorder (DVR) 108 directing the DVR 108 to record the stream of media data 170. The DVR 108 may store the stream of media data 170 as a recording 124. In addition, the DVR 108 may provide the stream of media data 170 live (i.e., a real-time stream) as well as an archived fault clip (e.g., the recording 124) to a troubleshooter at the second office 104.

Either the real-time stream of the stream of media data 170 or the recording 124 of the stream of media data 170 may be used to troubleshoot the media channel experiencing a fault in transmission. For example, the troubleshooter at the second office 104 may use the recording 124 to determine a source of the fault in the media channel. Automatically transmitting the stream of media data 170 to the second office 104 and recording the stream of media data 170 enables the troubleshooter at the second office 104 to have substantially immediate access to the media data associated with the fault. For example, if the first office 102 did not transmit the stream of media data 170 in response to detecting the fault, the troubleshooter at the second office 104 may have to request a copy of media data corresponding to the media channel from the first office 102 before beginning the troubleshooting process, and in response to receiving the request, the first office 102 would capture and transmit the requested media data to the second office 104. In this case, the productivity and responsiveness of the troubleshooter may be diminished while waiting for the requested media data to be transmitted.

In another example, if the first office 102 converts the stream of media data 170 from a digital format to an analog format for storage at the first office 102, the stored video and audio may be re-converted from analog to digital before being transmitted to the second office in response to a request from the troubleshooter. Video and audio that has been converted may lose information that is relevant to the troubleshooter. Thus, transmitting non-converted media data to the second office 104 in response to detecting a fault may preserve the quality of the stream of media data 170 and improve the effectiveness of the troubleshooting process.

Figure 2:
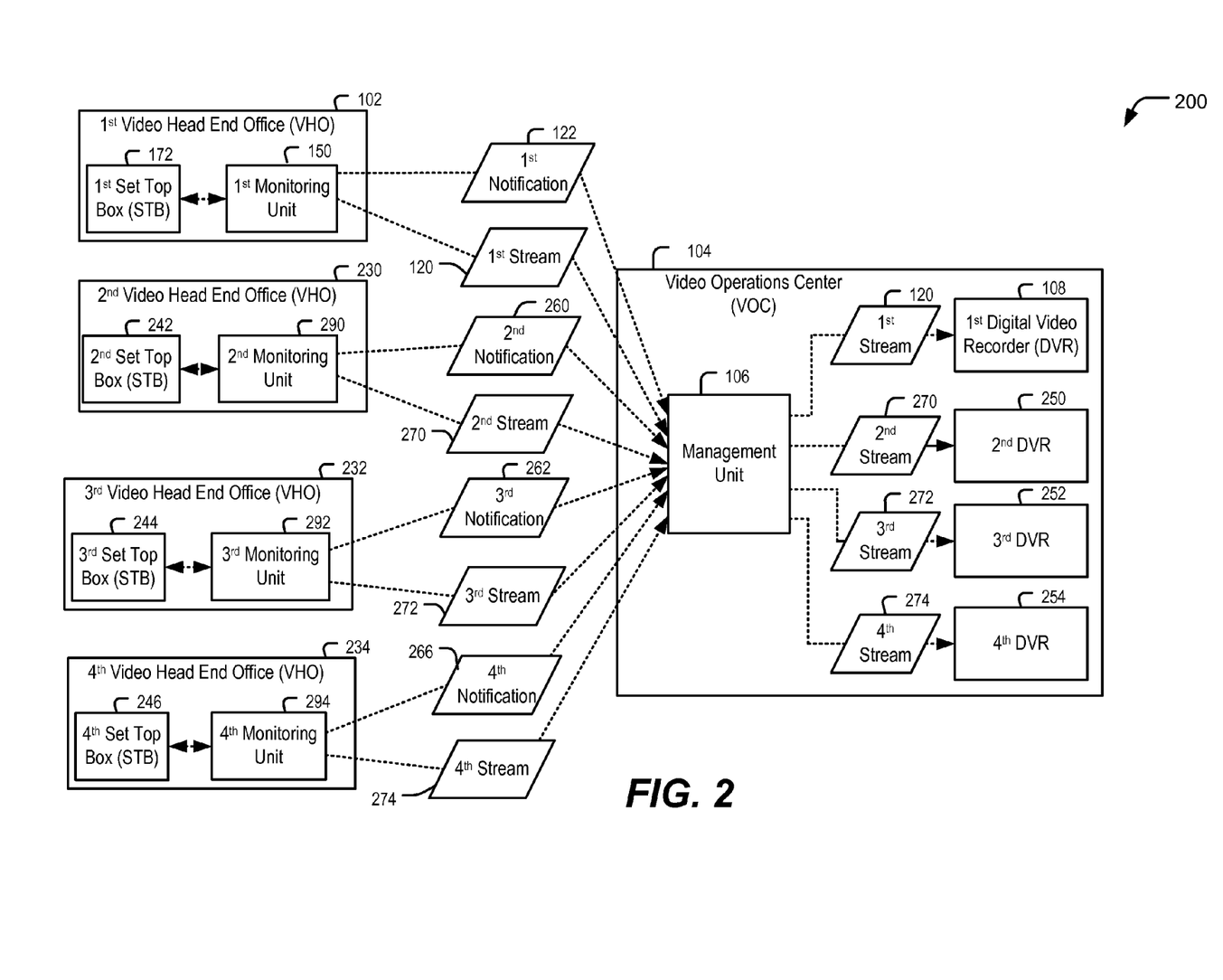
FIG. 2 is a diagram of a second embodiment of a system to detect a fault in transmission of a stream of media data corresponding to a media channel.

Referring to FIG. 2, a particular embodiment of a system 200 that detects a fault in transmission of a stream of media data corresponding to a media channel is disclosed. The system 200 includes components of the system 100 of FIG. 1, such as the second office 104 (represented as a video operations center (VOC) in FIG. 2) and the first office 102 (represented as the first video head end office (VHO) in FIG. 2) that is connected to the first set top box (STB) 172. The system 200 also includes a second VHO 230 that is connected to a second STB 242, a third VHO 232 that is connected to a third STB 244, and a fourth VHO 234 that is connected to a fourth STB 246. The video head end offices 102, 230, 232, 234 may be television content distribution centers that each serve subscriber areas that include one or more cities. For example, the first VHO 102 may be in Texas and the second VHO 230 may be in New York. The VOC 104 may be at a central location, such as Kansas, where fault clips from each of the VHOs may be analyzed to remedy detected faults.

Each VHO 102, 230, 232, 234 may include a monitoring unit (e.g., the first monitoring unit 150, a second monitoring unit 290, a third monitoring unit 292, and a fourth monitoring unit 294) to scan a respective STB 172, 242, 244, 246 to detect a fault. In response to detecting a fault with a particular channel at a particular VHO, the particular VHO may transmit a notification and a stream of media data corresponding to the particular channel to the VOC 104. For example, in response to detecting a fault in a second media channel, the second monitoring unit 290 of the second VHO 230 may transmit to the VOC 104 a second notification 260 and a second stream 270 of media data corresponding to the second channel. The third monitoring unit 292 of the third VHO 232 may transmit a third notification 262 and a third stream 272 of media data in response to detecting a fault in a third channel. In response to detecting a fault in a fourth channel, the fourth monitoring unit 294 of the fourth VHO 234 may transmit a fourth notification 266 and a fourth stream 274 of media data corresponding to the fourth channel.

The management unit 106 of the video operations center 104 may be configured to assign a digital video recorder (DVR) to record the received streams of media data 170, 270, 272, 274 based on the notification 122, 260, 262, 266. For example, the VOC 104 may include a DVR that is dedicated to recording content received from a particular video head end office. To illustrate, a received notification may indicate which VHO 102, 230, 232, 234 sent the notification. For example, in response to receiving the first notification 122 from the first VHO 102, the management unit 106 may transmit the first stream of media data 170 to the first DVR 108. The second stream 270 may be recorded at a second DVR 250 based on information within the second notification 260. The third stream 272 of media data may be recorded at a third DVR 252 and the fourth stream 274 of media data may be recorded at a fourth DVR 254. In a particular embodiment, the VOC 104 includes a plurality of DVRs assigned to each VHO.

By providing a central location (e.g., the VOC 104) that records the media channels with faults, the IQM troubleshooting process may be centralized. For example, one or more operators may review the faults with the media channels of all of the VHOs at a central location. In addition, by centralizing the storage of recordings of streams rather than using local storage at the first office 102, the complication and expense of the hardware for the local storage may be reduced.

Figure 3:
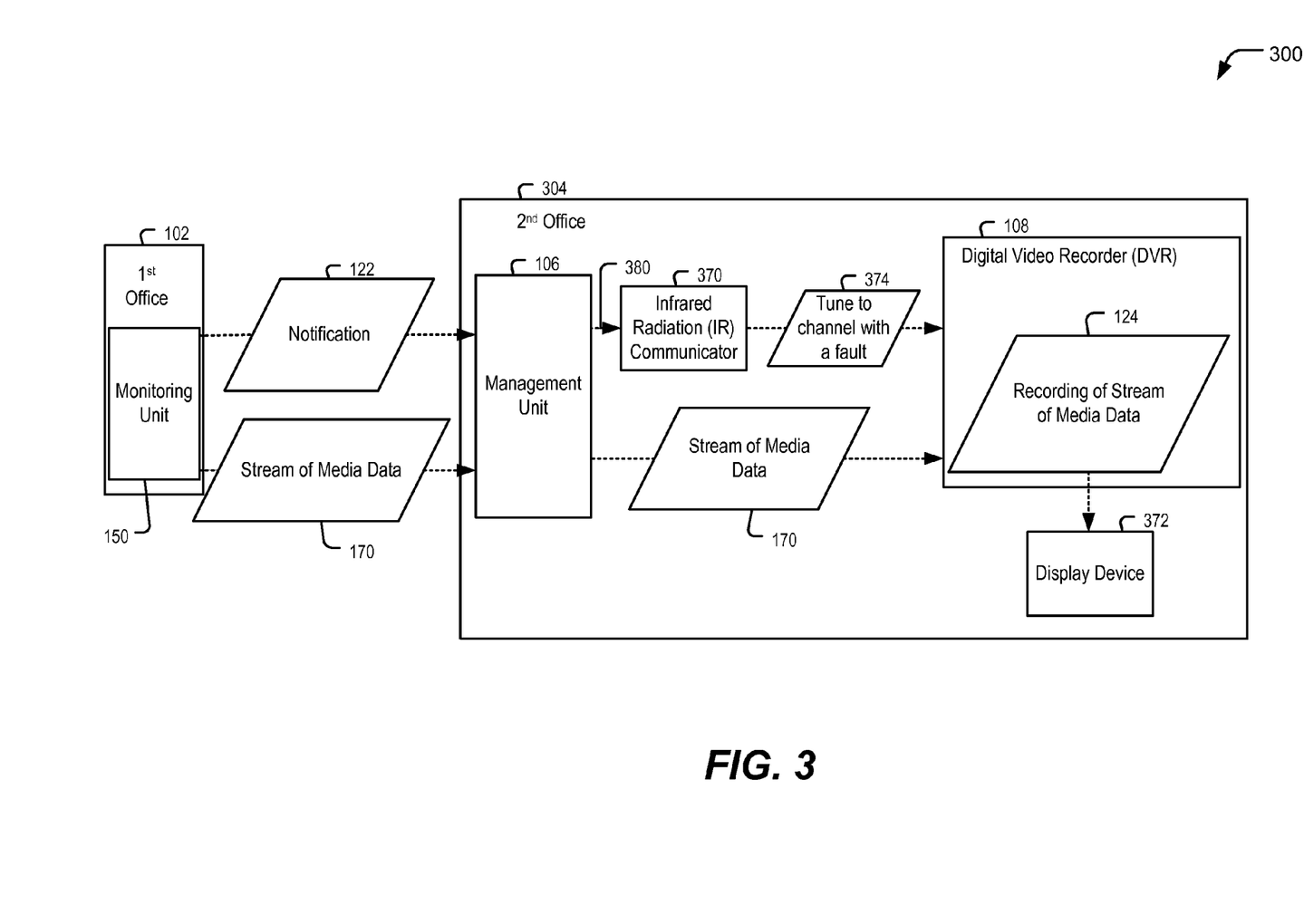
FIG. 3 is a diagram of a third embodiment of a system to detect a fault in transmission of a stream of media data corresponding to a media channel.

Referring to FIG. 3, a particular embodiment of a system 300 that detects a fault in transmission of a stream of media data corresponding to a media channel is disclosed. The system 300 includes the first office 102 of FIG. 1. The system 300 also includes a second office 304 that includes the management unit 106 and digital video recorder (DVR) 108 of FIG. 1 in addition to an infrared (IR) communicator 370 and a display device 372.

The IR communicator 370 may be configured to translate a command received from the management unit 106 into an IR signal that is transmitted to the DVR 108. For example, in response to receiving the notification 122, the management unit 106 may send a command 380 to the IR communicator 370 to tune the DVR 108 to the media channel indicated by the notification 122. The IR communicator 370 may send an IR signal 374 to the DVR 108 to tune the DVR 108 to the identified media channel. The management unit 106 may also be configured to instruct the DVR 108 (via the IR communicator 370) to transmit a recording 124 of the stream of media data 170 to the display device 372.

By receiving, recording, and playing back video and audio corresponding to channels experiencing faults in transmission, a member of the troubleshooting staff of the second office 304 may be automatically presented with the recording 124 of the stream of media data 170 representative of the fault. In a particular embodiment, the second DVR 250, the third DVR 252, and the fourth DVR 254 of FIG. 2 may also be associated with a corresponding IR communicator and a display device.

Figure 4:
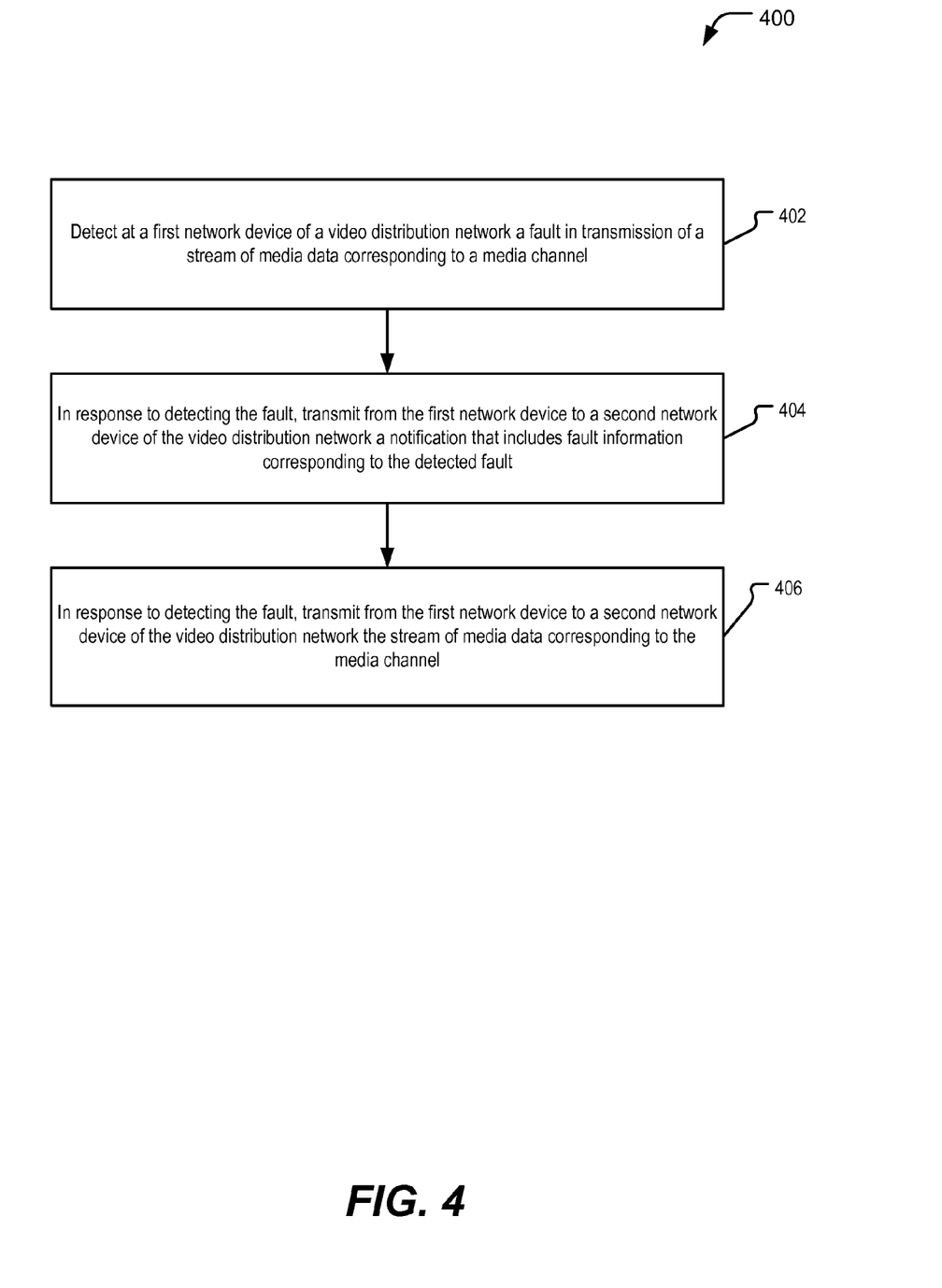
FIG. 4 is a flow diagram of a first embodiment of a method to detect a fault in transmission of a stream of media data corresponding to a media channel.

Referring to FIG. 4, a particular embodiment of a method 400 to detect a fault in transmission of a stream of media data corresponding to a media channel is disclosed. The method 400 includes detecting at a first network device of a video distribution network a fault in transmission of a stream of media data corresponding to a media channel, at 402. For example, in FIG. 1, the monitoring unit 150 at the first office 102 may detect a fault in transmission of the stream of media data 170 corresponding to a media channel. The first network device may be located at a first office that transmits the stream of media data to a subscriber and the second network device may be located at a second office that remedies the detected fault. For example, the first office may be a video head end office (VHO) and the second office may be a video operations center (VOC). The fault may be detected by periodically scanning through media channels at a set top box connected to the first office.

The method 400 also includes in response to detecting the fault, transmitting from the first network device to a second network device of the video distribution network a notification that includes fault information corresponding to the detected fault, at 404. For example, in FIG. 1, the first office 102 transmits the notification 122 that includes the fault information 160. The notification may be a simple network message protocol (SNMP) message (e.g., a trap protocol data unit (PDU)). The fault information in the notification may identify the particular type of fault. For example, the type of the fault may include blank video, frozen video, macro-blocked video, silent audio, audio noise, incorrect audio levels, or any combination thereof.

The method 400 also includes in response to detecting the fault, transmitting from the first network device to the second network device the stream of media data corresponding to the media channel, at 406. For example, in FIG. 1, the monitoring unit 150 transmits the stream of media data 170. The stream of media data may be transmitted to the second network device without converting a format of the stream of media data (e.g., from digital to analog). A member of the troubleshooting staff at an office that includes the second network device may troubleshoot the fault based on a preserved copy of the stream of media data that is not corrupted by a conversion process, thereby improving the internet protocol television quality monitor process.

Figure 5:
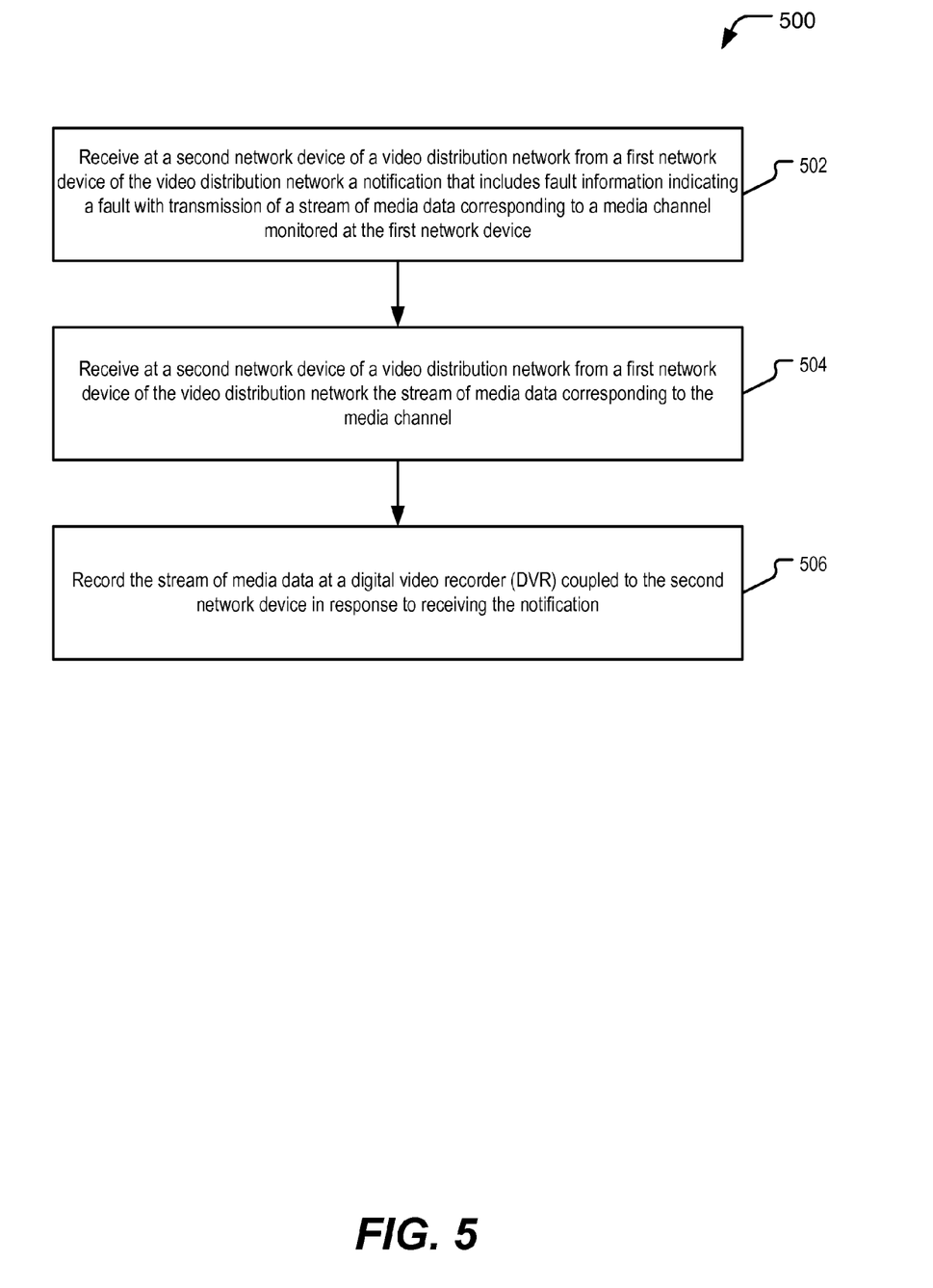
FIG. 5 is a flow diagram of a second embodiment of a method to detect a fault transmission of a stream of media data corresponding to a media channel.

Referring to FIG. 5, a particular embodiment of a method 500 to detect a fault in transmission of a stream of media data corresponding to a media channel includes receiving, at a second network device of a video distribution network from a first network device of the video distribution network, a notification that includes fault information indicating a fault with transmission of a media channel monitored at the first network device, at 502. For example, in FIG. 3, the management unit 106 receives the notification 122 from the first office 102. The notification may be a simple network message protocol (SNMP) message (e.g., a trap protocol data unit (PDU)).

The method 500 may also include tuning a digital video recorder (DVR) to the media channel experiencing the fault in response to receiving the notification. For example, in FIG. 3, the infrared (IR) communicator 370 directs the DVR 108 to tune to the media channel in response to receiving the notification 122.

The method 500 also includes receiving at the second network device from the first network device the stream of media data corresponding to the media channel, at 504. For example, in FIG. 3, the management unit 106 may receive the stream of media data 170 corresponding to the media channel experiencing a fault.

The method 500 also includes in response to receiving the notification, recording the stream of media data at a digital video recorder (DVR) coupled to the second network device, at 506. The DVR may be dedicated to recording media channels received from the first network device. For example, in FIG. 3, the digital video recorder (DVR) 108 in the second office 104 records the stream of media data 170 from the first office 102 as the recording 124.

The method 500 may also include directing the DVR to transmit the recorded stream of media data to a display device. For example, in FIG. 3, the IR communicator 370 may direct the DVR 108 to transmit the recording 124 of the stream of media data 170 to the display device 372. Productivity of the troubleshooting staff may be increased by automatically transmitting, recording, and displaying recordings at a display device, since the staff avoids making requests or cueing the recordings.

Figure 6:
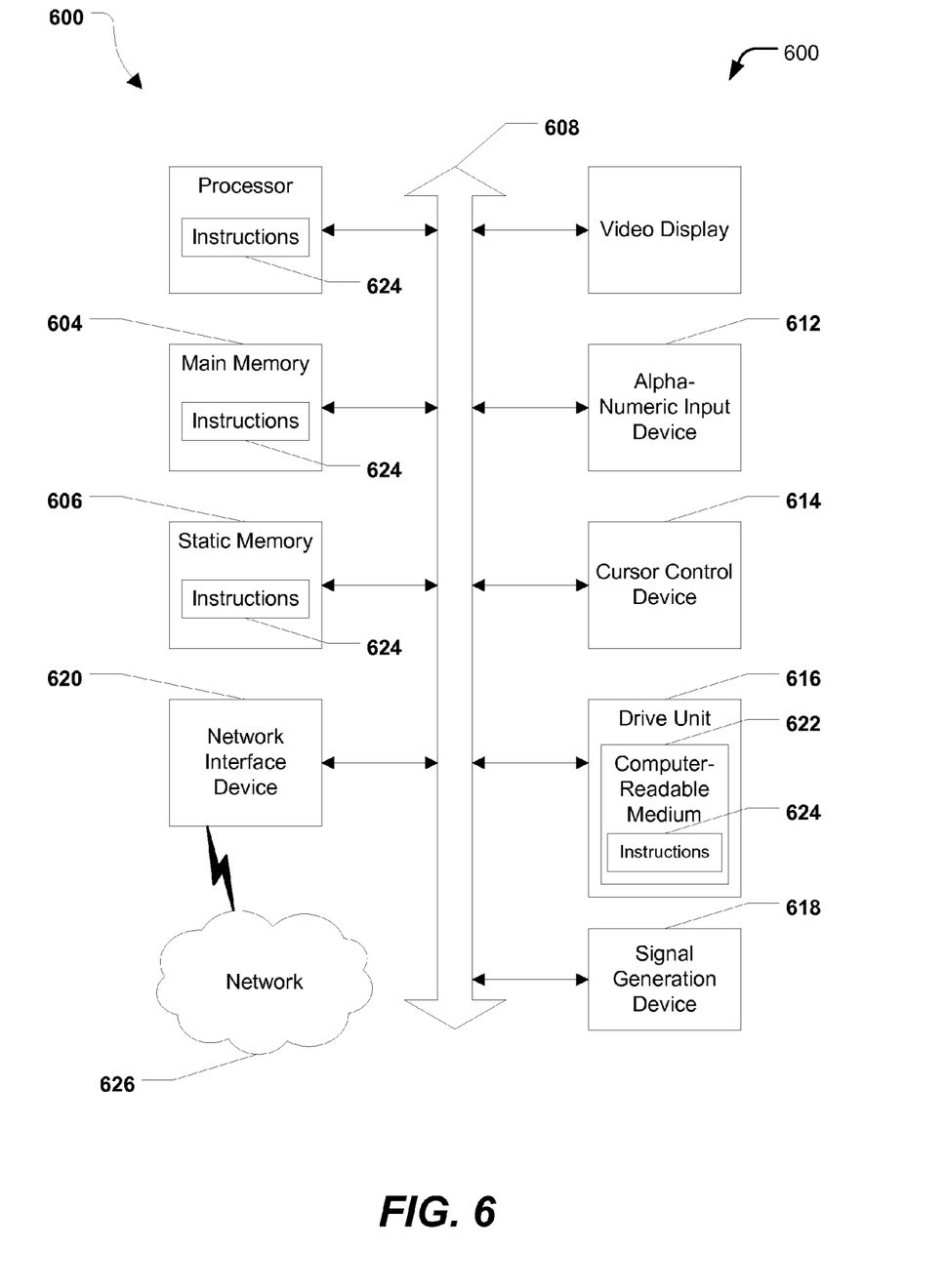
FIG. 6 is a diagram of an illustrative embodiment of a general computer system that detects a fault in transmission of a stream of media data corresponding to a media channel.

Referring to FIG. 6, an illustrative embodiment of a general computer system 600 that detects a fault in transmission of a stream of media data corresponding to a media channel is disclosed. The computer system 600 can include a set of instructions that can be executed to cause the computer system 600 to perform any one or more of the methods or computer based functions disclosed herein, such as some or all of the action of the methods of FIGS. 4-5. The computer system 600, or any portion thereof, may operate as a standalone device or may be connected, e.g., using a network, to other computer systems or peripheral devices. For example, the computer system 600 may include or be included with any one or more of the first office 102, the second office 104, the management unit 106, the digital video recorder 108, the monitoring unit 150, and the set top box 172 of FIG. 1.

In a networked deployment, the computer system 600 may operate in the capacity of a server. The computer system 600 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 may include a main memory 604 and a static memory 606 that can communicate with each other via a bus 608. As shown, the computer system 600 may further include a video display unit 610, such as a liquid crystal display (LCD), an organic light emitting diode (OLED), a flat panel display, or a solid-state display. Additionally, the computer system 600 may include an input device 612, such as a keyboard, and a cursor control device 614, such as a mouse. The computer system 600 can also include a disk drive unit 616, a signal generation device 618, such as a speaker, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible, non-transitory, storage medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

Although the present specification describes components and functions that may be implemented in particular embodiments with reference to particular standards and protocols, the invention is not limited to such standards and protocols. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
   receiving, at a first network device of a video distribution network, a stream of media data from a user device;
   detecting a fault in the stream of media data; and
   in response to detecting the fault in the stream of media data, automatically sending from the first network device to a second network device of the video distribution network:
   a notification that includes fault information corresponding to the fault; and
   the stream of media data, wherein the stream of media data includes data representing a transmission of a media channel as received by the user device.

2. The method of claim 1, wherein the first network device is located at a first office that transmits the media channel to a subscriber and the second network device is located at a second office that remedies the fault.

3. The method of claim 1, wherein the second network device is associated with remedying detected faults.

4. The method of claim 1, wherein the stream of media data is sent to the second network device without converting a format of the stream of media data from digital to analog.

5. The method of claim 1, wherein the fault information identifies a type of the fault.

6. The method of claim 5, wherein the type of the fault includes blank video, frozen video, macro-blocked video, silent audio, audio noise, incorrect audio levels, or any combination thereof.

7. The method of claim 1, wherein the user device is a set top box connected to the first network device, and further comprising periodically scanning through media channels at the set top box to detect the fault.

8. The method of claim 1, wherein the notification is a simple network message protocol message.

9. A method comprising:
   receiving at a second network device of a video distribution network from a first network device of the video distribution network:
   a notification that includes fault information indicating a fault with a transmission of a media channel received at a user device, wherein the first network device monitors a stream of media data sent by the user device to the first network device; and
   the stream of media data; and
   in response to receiving the notification, recording the stream of media data at a digital video recorder coupled to the second network device, wherein the stream of media data includes data representing the transmission of the media channel as received by the user device.

10. The method of claim 9, wherein the notification is a simple network message protocol message.

11. The method of claim 9, wherein the digital video recorder is dedicated to recording media content from the first network device.

12. The method of claim 9, further comprising tuning the digital video recorder to the media channel in response to receiving the notification.

13. The method of claim 9, further comprising directing the digital video recorder to send the stream of media data to a display device coupled to the digital video recorder.

14. The method of claim 9, wherein the fault includes blank video, frozen video, macro-blocked video, silent audio, audio noise, incorrect audio levels, or any combination thereof.

15. A system comprising:
a management unit of a video distribution network, the management unit configured to receive from a monitoring unit of the video distribution network:
a notification that includes fault information indicating a fault in a transmission of a media channel received at a user device, wherein the monitoring unit monitors a stream of media data sent by the user device to the monitoring unit; and
the stream of media data; and
a digital video recorder coupled to the management unit, the digital video recorder configured to record the stream of media data in response to the management unit receiving the notification that includes the fault information, wherein the stream of media data includes data representing the transmission of the media channel as received by the user device.

16. The system of claim 15, further comprising an infrared communicator coupled to the digital video recorder.

17. The system of claim 16, wherein the management unit is configured to command the infrared communicator to direct the digital video recorder to transmit recorded video and audio corresponding to the media channel with the fault to a display device.

18. The system of claim 17, further comprising a plurality of digital video recorders coupled to the management unit, wherein each digital video recorder of the plurality of digital video recorders is dedicated to recording audio and video received from one of a plurality of monitoring units.

19. The system of claim 15, wherein the monitoring unit is located at a first office of the video distribution network and the management unit and the digital video recorder are located at a second office of the video distribution network.

20. The system of claim 15, wherein the media channel is received from a content source via a multicast group.

* * * * *